（12） United States Patent
Yashiki et al.

(10) Patent No.: US 7,293,114 B2
(45) Date of Patent: Nov. 6, 2007

(54) NETWORK SCANNING SYSTEM THAT A DRIVER TRANSMITS A SCAN COMMAND THROUGH AN APPLICATION

(75) Inventors: Mitsuhiro Yashiki, Kosugi-machi (JP); Yasushi Takemura, Tsubata-machi (JP); Nobuhisa Yamazaki, Tsubata-machi (JP)

(73) Assignee: PFU Limited, Ishikawa (JP)

( * ) Notice: Subject to any disclaimer, the term of this patent is extended or adjusted under 35 U.S.C. 154(b) by 196 days.

(21) Appl. No.: 10/507,818

(22) PCT Filed: Mar. 18, 2003

(86) PCT No.: PCT/JP03/03227

§ 371 (c)(1),
(2), (4) Date: Sep. 14, 2004

(87) PCT Pub. No.: WO03/079665

PCT Pub. Date: Sep. 25, 2003

(65) Prior Publication Data

US 2005/0125576 A1    Jun. 9, 2005

(30) Foreign Application Priority Data

Mar. 18, 2002  (JP) .............................. 2002-073735

(51) Int. Cl.
*G06F 3/00* (2006.01)
(52) U.S. Cl. .......................................... 710/5; 719/321

(58) Field of Classification Search .................... 710/5; 719/321
See application file for complete search history.

(56) References Cited

U.S. PATENT DOCUMENTS

| 5,764,866 | A |   | 6/1998 | Maniwa ..................... 358/1.15 |
| 6,256,662 | B1 | * | 7/2001 | Lo et al. ...................... 709/203 |
| 2003/0101289 | A1 | * | 5/2003 | Alikberov et al. .......... 709/321 |
| 2003/0167684 | A1 | * | 9/2003 | Carlson et al. ............... 47/57.6 |

FOREIGN PATENT DOCUMENTS

| JP | 11-355489 | 12/1999 |
| JP | 2000-59561 | 2/2000 |
| JP | 2001-285560 | 12/2001 |

* cited by examiner

*Primary Examiner*—Donald Sparks
*Assistant Examiner*—Harold Kim

(57) ABSTRACT

A scanner system includes a scanner, computers sharing the scanner, a network connecting between them, and a scanner controlling apparatus connected between the network and the scanner. The computer includes a device driver to control the scanner and notify the scanner controlling apparatus of an event in the device driver, and an application to control the device driver, and transmit and receive data to and from the scanner controlling apparatus. The application activates the device driver in response to the trigger input from the scanner controlling apparatus. When activating, the device driver receives image data from the scanner controlling apparatus through the application.

5 Claims, 6 Drawing Sheets

NETWORK SCANNING SYSTEM THAT A DRIVER TRANSMITS A SCAN COMMAND THROUGH AN APPLICATION

BACKGROUND OF THE INVENTION

1. Field of the Invention

This invention relates to a scanner system, and more particularly to a scanner system which can efficiently be shared among a plurality of personal computers through the use of a relatively simple configuration without any burdens on users.

2. Description of the Related Art

At a typical office, a scanner is usually connected to a personal computer and the scanner and the personal computer are used as a set. That is, virtually one scanner is connected to one personal computer.

However, the personal computer takes a large installation space, incurring costs. Therefore, it is desirable a scanner be shared among several users at a typical office from the viewpoint of installation space and cost. That is, it is desirable that one scanner is shared among a plurality of personal computers.

One approach to the shared use of single scanner among the plurality of personal computers is to exclusively use a network device driver, namely a TWAIN driver or TWAIN driver device control, running on a personal computer to share the scanner on a sharing interface of the network.

However, this approach has a problem, which will be described with reference to FIGS. 5 and 6. A user starts an application 221, an image processing program, on his or her (personal) computer 200 (step S41), activates a device drier (TWAIN driver) 222 (step S42), sets scan parameters (step S43), and locks a scanner 100 to use through a SCSI interface 223 and SCSI hardware 224 (step S424). The user then goes to the location at which the scanner 100 is installed and sets paper (step S45). The user goes back to the location of the computer 200, operates the application 221 (step S46) to start scanning (step S47), and check to see whether the scanning is successfully completed (step S48). When the scanning is successfully completed, the user ends the scanning (step S49), and unlocks the scanner 100 (step S410). Then the user goes to the scanner 100 location to take the paper (step S411). When the scanning is not successfully completed at the step S48, that is, when failure occurs, the step S45 and the subsequent steps are repeated.

In this way, the user makes two trips between the computer 200 and the scanner 100. During the period of time in which the scanner 100 is locked, including the time required for the two trips, other users cannot use that scanner 100. Moreover, when scanning is not successfully completed due to a paper jam (step S48), the user should go to the scanner 100 location (step S45), clear the paper jam, set another paper sheet, go back to the computer 200 location, and re-operate the application 221. Thus, this approach is considerably inconvenient.

Another approach is to include all scanner control functions in a small scanner controlling apparatus. That is, a small personal computer dedicated to the scanner is associated with a scanner.

According to this approach, however, a user must develop a device driver for each type of scanner on his/her own. Accordingly, an enormous burden would be placed on the user. For example, when the user wants to connect a new scanner which is a different type with the old one, the user must develop a new device driver (scanner driver) for the scanner. In effect, such a new scanner cannot be employed, which is considerably inconvenient.

SUMMARY OF THE INVENTION

It is an object of the present invention to provide a scanner system which can efficiently be shared among users with a relatively simple configuration without placing burdens on the users.

A scanner system of the present invention comprises a scanner, at least one computer sharing the scanner, a network connecting between the scanner and the computer, and a scanner controlling apparatus connected between the network and the scanner. The computer further comprises a device driver to control the scanner and notify the scanner controlling apparatus of an event in the device driver, and an application (program) to control the device driver, and transmit and receive data to and from the scanner controlling apparatus. The application is a resident program, is waiting for a trigger input from the scanner controlling apparatus, and activates the device driver in response to the trigger input. In a case that the device driver is activated, the device driver receives image data from the scanner controlling apparatus through the application.

According to the scanner system of the present invention, the device driver is activated in response to a trigger input from the scanner controlling apparatus without taking the trouble to start the application, and the scanner controlling apparatus is notified of an event in the device driver. Accordingly, the user can perform all operations, except predetermined operations, at the scanner controlling apparatus and can know the result of the process at the scanner controlling apparatus. Therefore, the user does not have to make trips between the computer and the scanner. Furthermore, the need for locking the scanner is eliminated. Therefore, the period during which the scanner is unavailable to other users can considerably be reduced. Moreover, when the scanner fails to complete a scan successfully due to a paper jam or the like, the user at the scanner location can know the failure and therefore can quickly address the failure such as a paper jam. Furthermore, according to the scanner system of the present invention, an existing driver can be used. Therefore, the need for developing a dedicated device driver for each scanner can be eliminated and any scanners can be chosen flexibly.

DETAILED DESCRIPTION OF THE PREFERRED EMBODIMENTS

FIG. 1 shows block diagrams of a scanner system. Shown in FIG. 1 is a general configuration of a scanner (sharing) system according to the present invention.

Figure 1A:
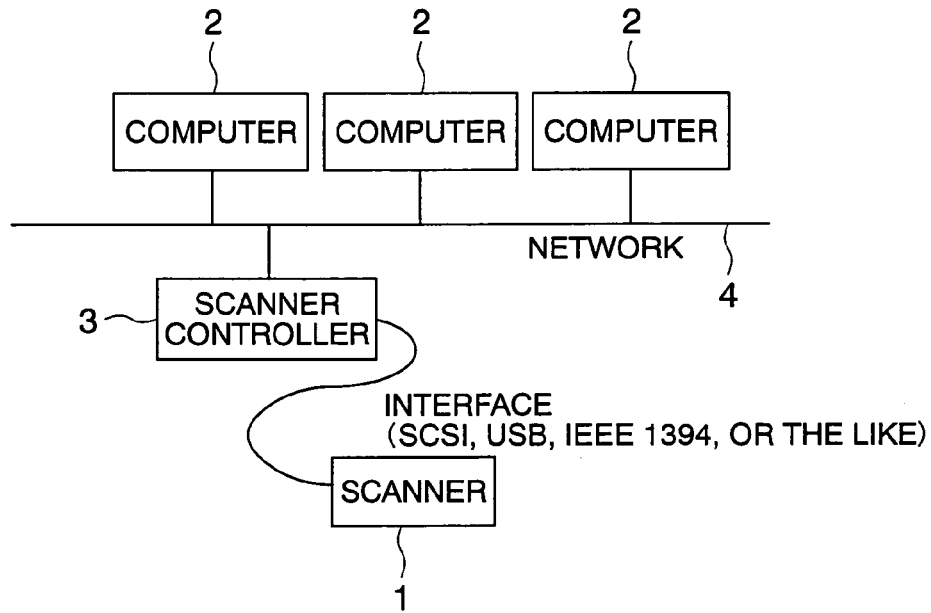
FIGS. 1A and 1B are block diagrams of a scanner system.

As shown in FIG. 1A, the scanner system comprises a scanner 1, at least one computer 2 (three computers in this example), a scanner controlling apparatus 3, and a network 4. At least one computer 2 (a plurality of computers), which may be a personal computer for example, is provided and shares the scanner. The network 4, which may be a LAN (Local Area Network) or a WAN (Wide Area Network), connects the scanner 1 with the computer 2. The scanner controlling apparatus 3 is provided between the network 4 and the scanner 1 and connects them with each other. The scanner controlling apparatus 3 has much simpler configuration than a personal computer (see FIG. 1B) and is connected with the scanner 1 through a well-known interface (for example SCSI, USB, or IEEE 1394). The scanner controlling apparatus is located next to (physically near) the scanner 1.

Figure 1B:
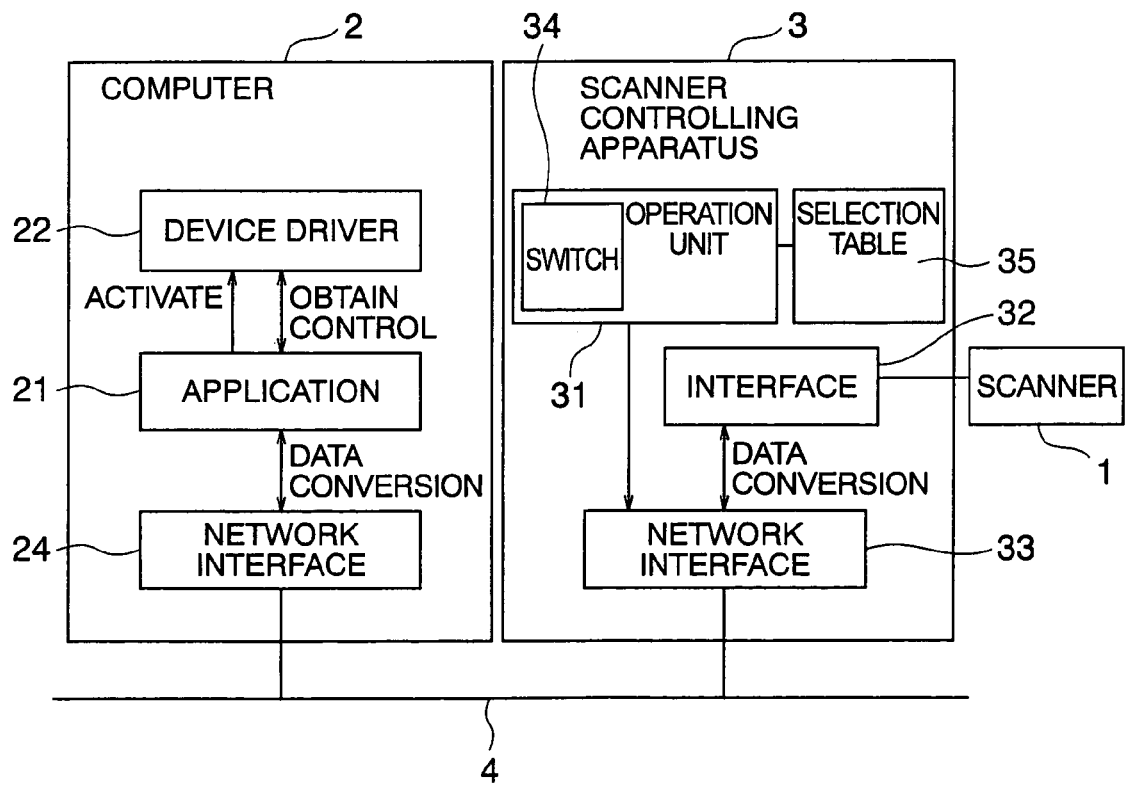
Figure 5:
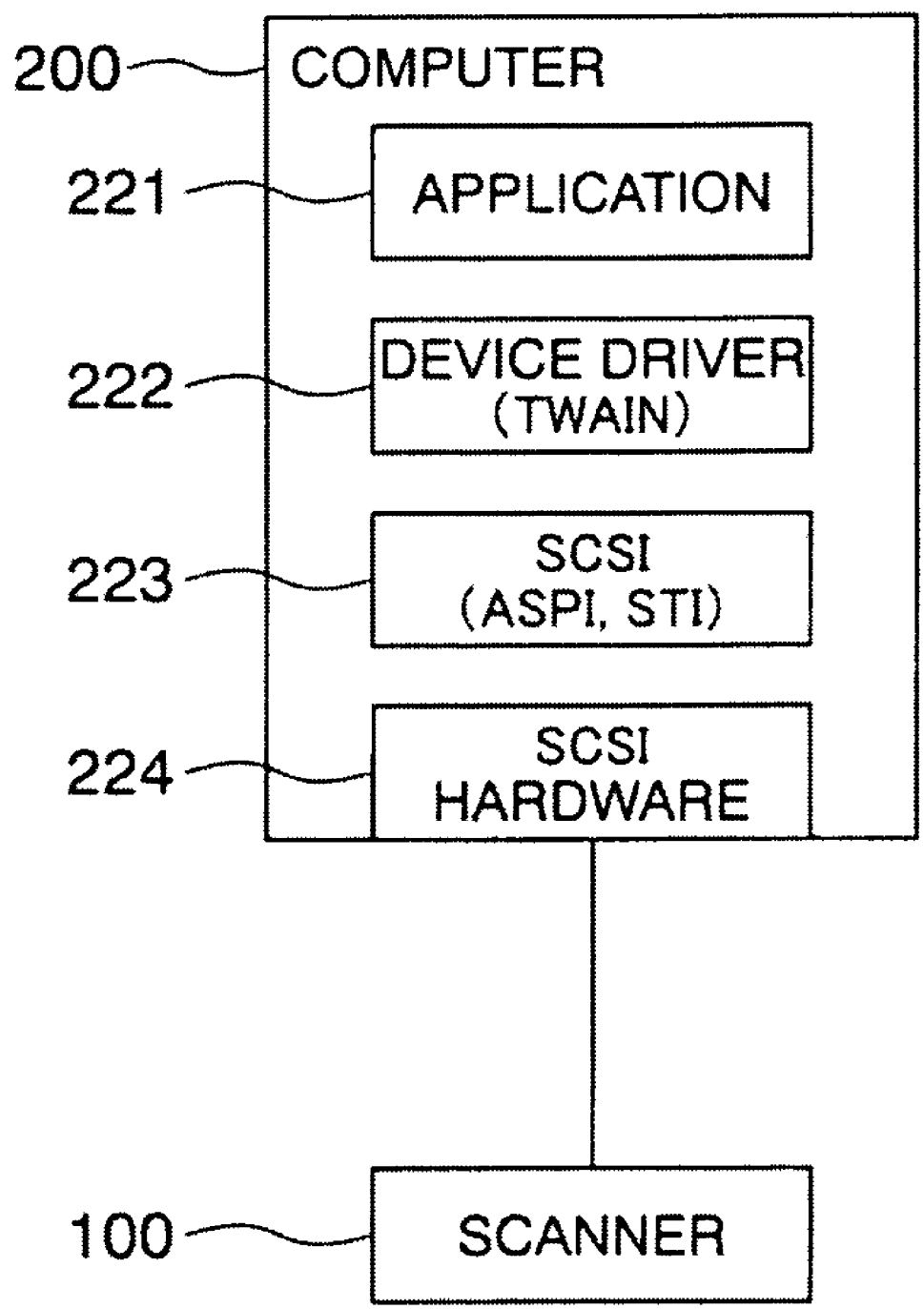
FIG. 5 is a diagram illustrating the prior art.

Each computer 2 has an application 21, a device driver 22, and a network interface 24, as shown in FIG. 1B. As seen from the comparison with FIG. 5, the application 21 is an image data processing program, which may be a commercially available image processing program to which the capability of interfacing between the device driver 22 and the network interface 24 is added. According to the present invention, the device driver 22 therefore always requests control from the application 21, rather than directly accessing the network interface 24. The device driver 22 may be a commercially available scanner driver such as a TWAIN driver. Accordingly, the user can use a commercially available device driver, rather than having to develop a device driver that suits to the scanner 1. The network interface 24 provides an interface (including hardware such as a communication device) with the network.

The application 21 is a resident program, which is started on power-up of the computer 2, loaded into the main memory (not shown) of the computer 2, and, after scan parameters are set, waits for an input from an external source. Accordingly, the user does not have to start the application 21 when using the scanner 1. The user can use the scanner 1 simply by entering data through the scanner controlling apparatus 3. The scan parameters include the scan resolution, the size of paper, type of data (binary data, gray data, or color data) to be scanned, and the output format of the scanner.

The application 21 activates the device driver 22 and transmits and receives data to and from the scanner controlling apparatus 3. The application 21 waits for a trigger input from the scanner controlling apparatus 3 and, in response to the trigger input, activates the device driver 22. When the application 21 is notified by the device driver 22 of reception of image data, the application 21 stores the image data as a file and terminates processing by the device driver 22.

The application 21 controls the activated device driver 22 to control the scanner 1 on the network 4 to scan the image data. In order to control the device driver 22, an input (actuation of a switch 34 or the like) to the operation module 31 of the scanner controlling apparatus 3 is sent from the scanner controlling apparatus 3 to the application 21 through the network 4. Therefore, the user can operate the application 21 and the scanner 1 at the location of the scanner controlling apparatus 3, rather than the location of the computer 2.

As described above, the application 21 also acts as an interface between the device driver 22 and the network interface 24. Accordingly, the application 21 transfers data between the device driver 22 and the scanner controlling apparatus 3 through the network interface 24 in response to a request from the device driver 22 and in doing so converts the formats of the data. In particular, the application 21 obtains a process to be performed by the device driver 22 for the actual interface (SCSI or the like) of the scanner 1 and transmits the process to the scanner controlling apparatus 3 before the process is outputted to the hardware. Likewise, transmission from the scanner controlling apparatus 3 is inputted first into the application 21 and then sent to the device driver 22. Thus, the device driver 22 operates as when the scanner 1 were connected to the device driver 22.

The device driver 22 is a scanner driver that controls the scanner 1 and notifies the scanner controlling apparatus 3 of the occurrence of an event (for example an error) in the device driver 22. After being activated by the application 21, the device driver 22 performs various processes. In particular, the device driver 22 transmits scan command data to the scanner controlling apparatus 3 through the application 21 in order to obtain the control over the scanner 1, and receives a response from the scanner controlling apparatus 3. When the response indicates an error or contains error information (this means that an event, "error detection," has occurred; the same applies where appropriate in the following description), the device driver 22 provides the notification to the scanner controlling apparatus 3. Otherwise, the device driver 22 does not provide notification (alternatively, it may notify the scanner controlling apparatus 3 of the occurrence of the event, "no errors are detected"; the same applies where appropriate in the following description). When the response is not an error response, the device driver 22 transmits an image data request to the scanner controlling apparatus 3 through the application 21 in order to receive the actual image data and receive a response from the scanner controlling apparatus 3. On the other hand, when the response is an error response, then the device driver 22 transmits the response to the scanner controlling apparatus 3. When the response is not an error response, the device driver 22 receives the image data from the scanner controlling apparatus 3 through the application 21.

The scanner controlling apparatus 3 comprises the operation module 31, an interface 32 with the scanner, and a network interface 33 as shown in FIG. 1B. The operation module 31 comprises a liquid crystal display (operator panel, not shown) including a plurality of switches 34 for selecting one of a plurality of computers sharing the scanner 1 and a selection table 35 for associating each of the switches with each of the plurality of computers. Inputted into the operation module 31 is an instruction for selecting one of the plurality of computers sharing the scanner 1 by the user operation of the switches 34. The interface 32 with the scanner 1 may be a well-known interface such as SCSI, USB, or IEEE 1394, as described above. The interface 32 transmits and receives data to and from the device driver 22 through the network interface 33 (and the network interface 24) and in doing so converts the formats of the data. The network interface 33 is the interface (including hardware such as a communication device) with the network 4.

Displayed on (the liquid crystal display of) the operation module 31 are switches #1, #2, and #3, for example, associated with computers PC#1, PC#2, and PC#3, respectively on the selection table 35. When a user selects and actuates switch #1 on (the liquid crystal display of) the operation module 31, the scanner controlling apparatus 3 refers to the selection table 35 on the basis of the selection input #1 to identify the computer PC#1 selected by the selection input #1 and transmits a trigger to the selected computer PC#1. Subsequently, each response and image data are also sent to the computer PC#1.

Figure 2:
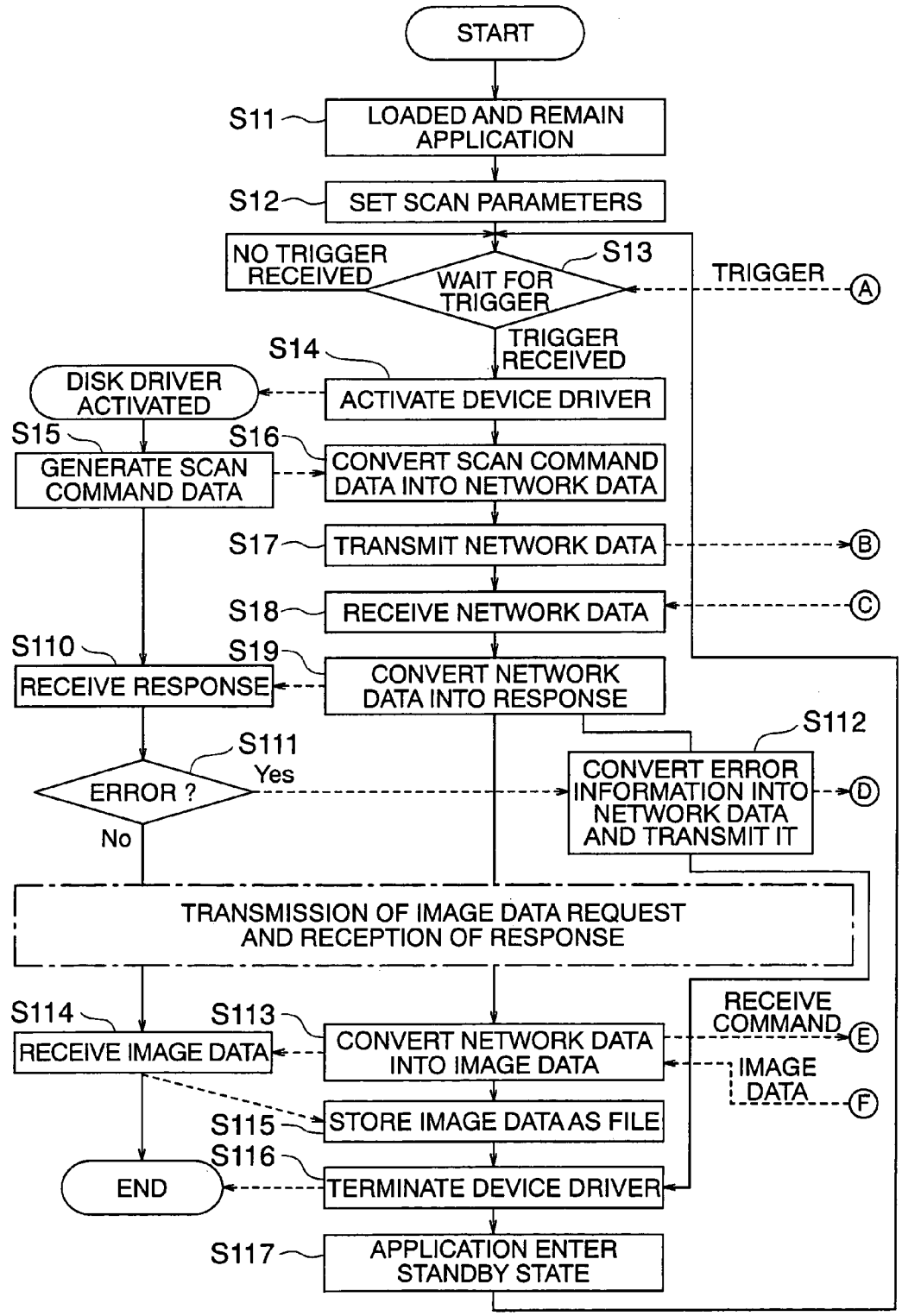
FIG. 2 shows a process flowchart in the scanner system.
Figure 3:
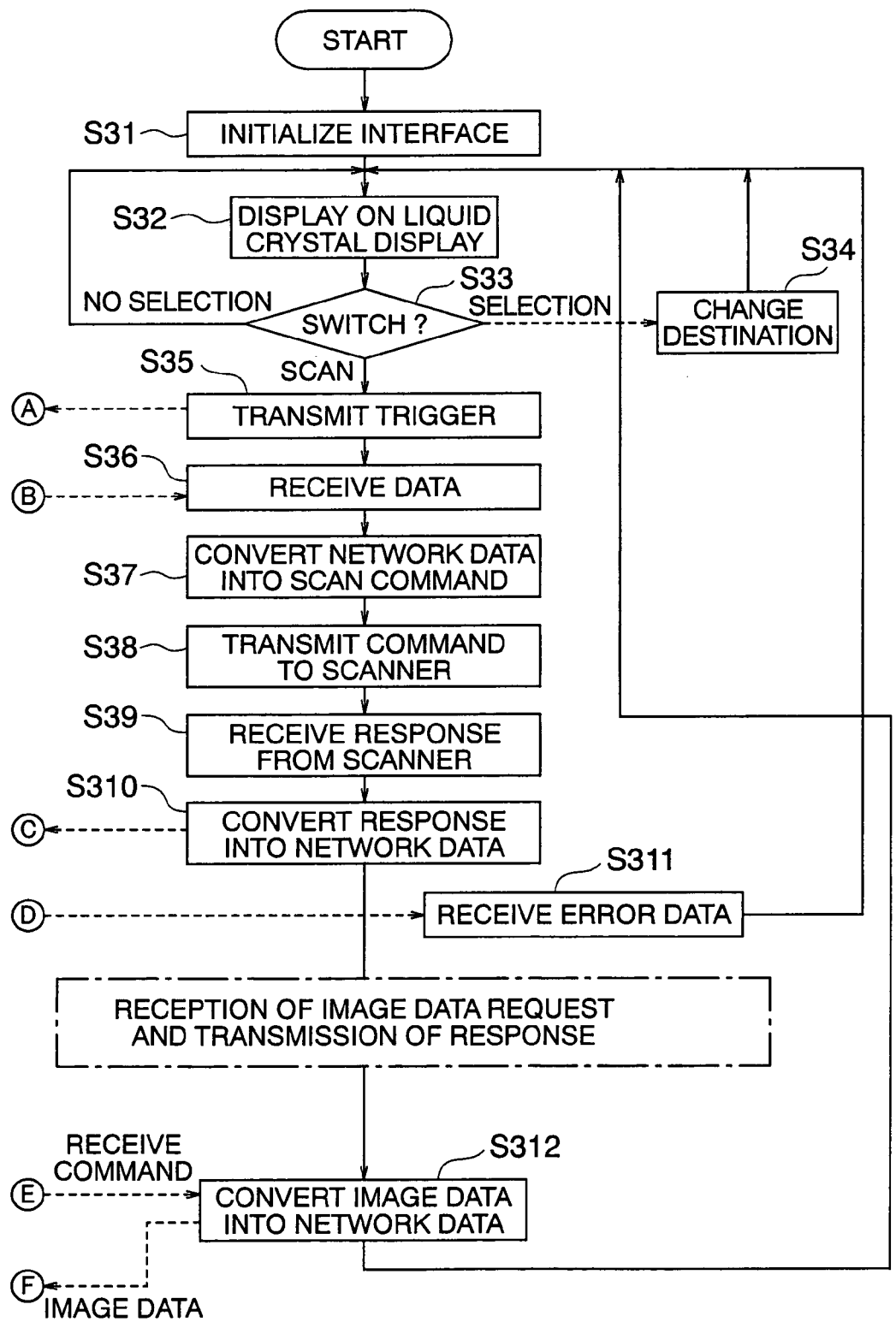
FIG. 3 shows a process flowchart in the scanner system.

FIGS. 2 and 3 are process flowcharts in the scanner system, which in combination show a process performed in the scanner system according to the present invention. FIG. 2 shows a process performed in the computer 2 and FIG. 3 shows a process performed in the scanner controlling apparatus 3.

In FIG. 2, when the application 21 on the computer 2 is started, the application 21 is loaded and remains in the main memory (step S11). When scan parameters are set by a user outside the device (step S12), the application 21 waits for a trigger input from the scanner controlling apparatus 3 (step S13). In particular, the application 21 periodically checks to see whether or not the trigger is inputted, and repeats this checking until the trigger is inputted. Thus, once the user sets scan parameters, he or she does not have to manipulate the operation 21 before using the scanner 1 (the user can change the scan parameters whenever necessary).

When a trigger is inputted from the scanner controlling apparatus 3 through the network interface 24 (see the step S35), the application 21 activates the device driver (TWAIN driver, for example) 22 (step S14). The device driver 22 activated generates scan command data and transmits the data to the application 21 (step S15). The application 21 receives the scan command data and converts the data into network data (step S16), transmits the network data to the scanner controlling apparatus 3 through the network interface 24 (step S17), receives network data (see the step S310) from the scanner controlling apparatus 3 as response for the scan command data (step S18), converts the network data into the response to the scan command data, and transmits the scan command data to the device driver 22 (step S19).

The device driver 22 receives this response (step S110) and determines whether or not the response indicates an error (step S11). When the response indicates an error (the event of error detection), the device driver 22 notifies the application 21 of the error (the occurrence of the event). The application 21 generates error information according to the notification, converts the error information into network data, and transmits the network data to the scanner controlling apparatus 3 through the network interface 24 (step S112). Then the application 21 performs the step S116 which will be described below and terminates the processing by the device driver (TWAIN driver) 22. Because the error information is provided to the scanner controlling apparatus 3, the user receives the error information near the scanner 1 location.

On the other hand, when the response does not indicate any error (the event of error detection) at the step S111, the device driver 22 transmits an image data request to and receives a response from the scanner controlling apparatus 3 through the application 21 (and the network interface 24). The transmission and reception of the image data request is performed in the same way with the transmission and reception of the scan command data at the steps 15 through 112. That is, it is not shown, the application 21 converts an image data request generated by the device driver 22 into a network data and transmit the network data to the scanner controlling apparatus 3. The application 21 receives a reply for the network data, which is also network data, and converts the reply into a response. Then, the application 21 determines whether or not there is an error in the response, and transmits error information when there is an error.

When the response to the image data request does not indicate any error, the application 21, subsequently to receiving the response, transmits a receive command to the scanner controlling apparatus 3, receives image data in network data format (see the step S312), converts the image data into image data and transmits the image data to the device driver 22 (step S113). The device driver 22 receives the image data and notifies the application 21 of the reception (step S114). The application 21 receives the notification, and stores the image data as a file (step S115), terminates the processing by the device driver (TWAIN driver) 22 (step S116), then enters the standby state (step S117) and repeats the step S13 and the subsequent steps.

In FIG. 3, the operation module 31 of the scanner controlling apparatus 3 initialize its interface in accordance with the scanner 1 (step S31), then displays switches on (the liquid crystal display of) the operation module 31 (step S32). That is, the operation module 31 displays the current state of the scanner controlling apparatus 3 (or the switch 34 which is currently selected, for example, switch #1), the other selector switches 34 which are not currently selected (switches #2 and #3, for example), and a switch for commanding the execution of "Scan". Then, the operation module 31 determines whether or not any of the switches (selector switches 34 or the "Scan" switch) is selected (step S33). When no switches are selected, the operation module 31 repeats the step S32 and the subsequent steps.

When a selector switch 34 other than the currently selected switch is selected, the operation module 31 changes the destination of a trigger and other data (step S34) and repeats the step 32 and the subsequent steps. For example, when the switch #2 is selected, the operation module 31 refers to the selection table 35 and changes the destination from computer PC#1 associated with the selected switch #1 to computer PC#2 associated with the newly selected switch #2.

When the "Scan" switch is selected, the operation module 31 transmits a trigger to the computer 2 associated with the currently selected switch 34 through the network interface 33 (step S35). For example, the module 31 transmits the trigger to a computer PC#1 associated with switch #1. Then, the network interface 33 receives network data (see the step S17) sent from the application 21 (therefore the device driver 22) (step S36), converts the network data into a scan command (step S37), and transmits the scan command to the scanner 1 through the interface 32 (step S38). In response to this, the scanner 1 performs preprocessing for the scan and transmits a response (for example, a scan-ready response or scan-ready error (failure of the scan-ready)) to the scan command to the network interface 33 through the interface 32. The network interface 33 receives the response to the scan command from the scanner 1 (step S39), converts the response into network data, and transmits the network data to the application 21 (step S310).

Then, when the network interface 33 receives the network data of error information (see the step S112) from the application 21 (step S311), the network interface 33 converts the received network data into error information and transmits the error information to the operation module 31. The operation module 31 displays the error information on (the liquid-crystal display of) the operation module 31 and repeats the step S32 and the subsequent steps.

On the other hand, when the network interface 33 does not receive scan command error information, the interface 33 receives an image data request from the application 21 and transmits a response to the application 21. The image data request and a response are sent and received in the same way that scan command data and response are sent and received at the step 36 through the step S310. That is, network data received from the application 21, not shown, is converted into an image data request and sent to the scanner 1. A response to the request is received and converted into network data, and the network data is sent to the application 21. In response to the image data request, the scanner 1 start scanning the image data and transmits a response (for example a response indicating the completion of the scan or an error (failure of the scan)) to the image data request.

When the network interface 33 receive no error information as the response to the image data request, the network interface 33 receives a receive command (see the step S113) from the application 21, converts the image data into network data, and transmits the network data to the application 21 (step S312). It should be noted that the network interface 33 receives the image data along with the response to the image data request from the scanner 1, or as a response to the receive command from the scanner 1.

Figure 4:
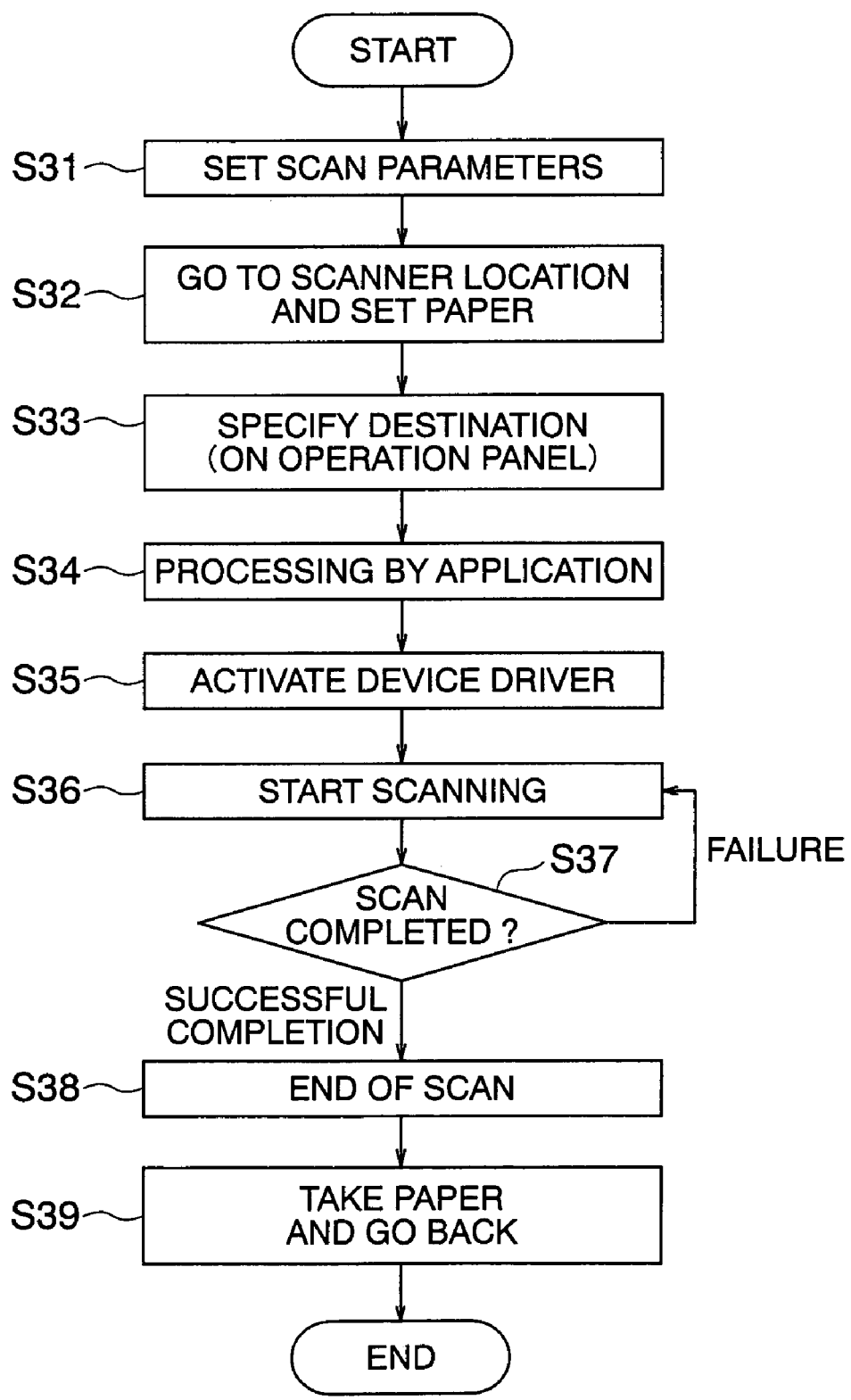
FIG. 4 shows a process flowchart for operating the scanner system.
Figure 6:
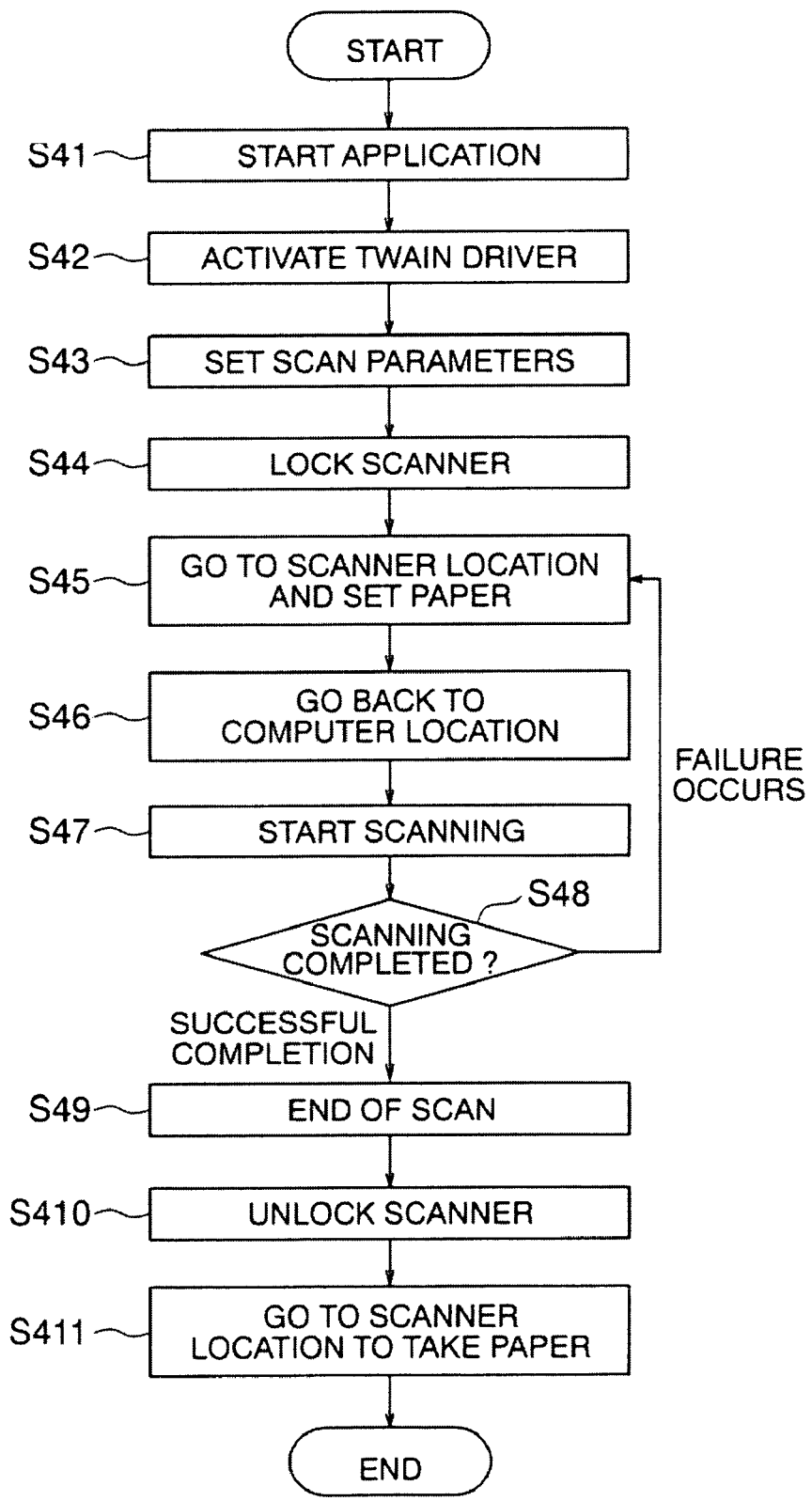
FIG. 6 is a diagram illustrating the prior art.

The process described above is performed in the scanner system. User-operations on the scanner 1 are performed as follows. FIG. 4 is a process flowchart for operating the scanner system, which shows operations performed by a user in the scanner system of the present invention and which should be compared with FIG. 6.

The user sets scan parameters in the application 21 resident in the main memory on his or her computer 2 (step S31). Then the user goes to the location of the scanner 1, sets paper (step S32), operates switches 34 on the operation module 31 of the scanner controlling apparatus 3 to specify his or her computer 2 as the destination to which data is to be sent (step S33). Then, the user causes the application 21 to start processing (step S34), activate the device driver (TWAIN driver) 22 (step S35), and the scan of image data is started by the scanner 1 (step S36). Then, the user checks to see whether the scan has been successfully completed (step S37) and, if so, ends the scan (step S38), take the paper, and goes back to the location of the computer 2 (step S39). On the other hand, when the scan has not successfully completed, that is, a failure has occurred at the step S37, then the step 36 and the subsequent steps are repeated. Thus, all what is required for the user to do in case of a failure is simply to restart the scanning operation.

In this way, the user does not have to lock the scanner 1 to unreasonably exclude other users from using the scanner. Only the period in which the scanner 1 is unavailable to other users is a period during which the scanner 1 is actually scanning data. Furthermore, the user has to make only one trip between the computer 2 and the scanner 1. Moreover, once the user goes to the location of the scanner 1, he or she can perform all operations at that location. When scanning is not successfully completed (step S37), the user can operate the scanner to clear the failure such as a paper jam at that location (step S36).

As described above, according to the present invention, the device driver is activated in response to a trigger input from the scanner controlling apparatus without taking the trouble to start the application, and the scanner controlling apparatus is notified of an event that occurs in the device driver. Accordingly, the user can perform almost all operations through the scanner controlling apparatus and can know the result of the process through the scanner controlling apparatus. Therefore, the need for the user to make trips between the computer and the scanner can be eliminated. Furthermore, the need for locking the scanner is eliminated and therefore the period during which the scanner is unavailable to other users can considerably be reduced. Moreover, when the scanner fails to complete a scan, the user at the scanner location can know the failure and therefore can quickly address the failure. Furthermore, according to the scanner system of the present invention, an existing device driver can be used. Therefore, the need for developing a dedicated device driver for each scanner can be eliminated.

What is claimed is:

1. A scanner system comprising:
   a scanner;
   a plurality of computers sharing the scanner;
   a network connecting between the plurality of computers; and
   a scanner controlling apparatus connected between the network and the scanner;
   wherein each of the plurality of computers comprises:
      a device driver to control the scanner and notify the scanner controlling apparatus of an event in the device driver; and
      an application to control the device driver, and transmit and receive data to and from the scanner controlling apparatus,
   wherein the application is a resident program, is waiting for a trigger input from the scanner controlling apparatus, and activates the device driver in response to the trigger input, and
   wherein, in a case that the device driver is activated, the device driver receives image data from the scanner controlling apparatus through the application, transmits a scan command to the scanner controlling apparatus through the application, receives a response to the scan command from the scanner controlling apparatus, and in a case that the response indicates an error, transmits the response to the scanner controlling apparatus.

2. The scanner system according to claim 1, wherein the device driver transmits an image data request to the scanner controlling apparatus through the application, receives a response to the image data request from the scanner controlling apparatus, and, in a case that the response indicates an error, transmits the response to the scanner controlling apparatus.

3. The scanner system according to claim 1, wherein, in a case that the application receives notification of reception of the image data from the device driver which receives the image data, the application stores the image data as a file and terminates processing performed in the device driver.

4. The scanner system according to claim 1, further comprising:
   a plurality of switches to select one of the plurality of computers sharing the scanner,
   wherein the scanner controlling apparatus transmits the trigger to the selected computer according to a selection input by the plurality of switches.

5. The scanner system according to claim 4, further comprising:
   an selection table in which each of the plurality of switches are associated with each of the plurality of computers,
   wherein the scanner controlling apparatus refers to the selection table to determine the computer selected according to the selection input by the plurality of switches.

* * * * *

UNITED STATES PATENT AND TRADEMARK OFFICE
CERTIFICATE OF CORRECTION

| | |
|---|---|
| PATENT NO. | : 7,293,114 B2 |
| APPLICATION NO. | : 10/507818 |
| DATED | : November 6, 2007 |
| INVENTOR(S) | : Mitsuhiro Yashiki et al. |

It is certified that error appears in the above-identified patent and that said Letters Patent is hereby corrected as shown below:

Column 8, Line 52, change "an selection" to --a selection--.

Signed and Sealed this

Twentieth Day of May, 2008

JON W. DUDAS
*Director of the United States Patent and Trademark Office*